United States Patent [19]
Daels et al.

[11] Patent Number: 5,903,713
[45] Date of Patent: May 11, 1999

[54] MOIRE FREE MULTILEVEL HALFTONING OF COLOR IMAGES

[75] Inventors: Katrien Daels, Lier; Paul Delabastita, Antwerpen, both of Belgium

[73] Assignee: Agfa-Gevaert N.V., Mortsel, Belgium

[21] Appl. No.: 08/640,593

[22] Filed: May 1, 1996

[30] Foreign Application Priority Data

May 5, 1995 [EP] European Pat. Off. ............ 95201168

[51] Int. Cl.$^6$ ...................................................... G06F 15/00
[52] U.S. Cl. ........................ 395/109; 358/456; 358/459; 358/298
[58] Field of Search ..................... 358/518, 521, 358/534–536, 429–430, 456–460, 298; 346/46; 347/15, 41, 131, 251; 395/109; 382/237

[56] References Cited

U.S. PATENT DOCUMENTS

| | | |
|---|---|---|
| 4,365,275 | 12/1982 | Berman et al. . |
| 4,860,026 | 8/1989 | Matsumoto et al. ............ 358/298 |
| 4,959,659 | 9/1990 | Sasaki et al. ................. 346/46 |
| 4,985,779 | 1/1991 | Gail . |
| 5,055,923 | 10/1991 | Kitagawa et al. .............. 358/298 |
| 5,155,599 | 10/1992 | Delabastita . |
| 5,204,753 | 4/1993 | Tai . |
| 5,258,849 | 11/1993 | Tai et al. . |
| 5,258,850 | 11/1993 | Tai et al. . |
| 5,260,807 | 11/1993 | Tai . |
| 5,291,311 | 3/1994 | Miller . |

FOREIGN PATENT DOCUMENTS

| | | |
|---|---|---|
| 0 141 869 | 11/1983 | European Pat. Off. . |
| 0 581 151 | 7/1993 | European Pat. Off. . |
| 2091518 | 7/1982 | United Kingdom . |

*Primary Examiner*—Scott Rogers
*Assistant Examiner*—Stephen Brinich
*Attorney, Agent, or Firm*—Robert A. Sabourin; Edward L. Kelley

[57] ABSTRACT

A halftone screen is presented for use in combination with reproduction devices that are capable of rendering more than two tone levels. The screen is optimized to minimize both tone and color shift in the presence of variations in the printing process. The intermediate density levels, which are assigned to a minority of the microdots within each halftone cell, are different within adjacent halftone cells. FIG. 9

6 Claims, 13 Drawing Sheets

| 0 | 0 | 0 | 0 | 0 | 0 | 0 | 0 |
|---|---|---|---|---|---|---|---|
| 0 | 1.0 | 1.0 | 0 | 0 | 1.0 | 1.0 | 0 |
| 0 | 0.75 | 0.0 | 0 | 0 | 1.0 | 0.0 | 0 |
| 0 | 0 | 0 | 0 | 0 | 0 | 0 | 0 |
| 0 | 0 | 0 | 0 | 0 | 0 | 0 | 0 |
| 0 | 1.0 | 1.0 | 0 | 0 | 1.0 | 1.0 | 0 |
| 0 | 1.0 | 0.25 | 0 | 0 | 1.0 | 0.50 | 0 |
| 0 | 0 | 0 | 0 | 0 | 0 | 0 | 0 | level 3.125

| 0 | 0 | 0 | 0 | 0 | 0 | 0 | 0 |
|---|---|---|---|---|---|---|---|
| 0 | 1.0 | 1.0 | 0 | 0 | 1.0 | 1.0 | 0 |
| 0 | 1.0 | 0.0 | 0 | 0 | 1.0 | 0.25 | 0 |
| 0 | 0 | 0 | 0 | 0 | 0 | 0 | 0 |
| 0 | 0 | 0 | 0 | 0 | 0 | 0 | 0 |
| 0 | 1.0 | 1.0 | 0 | 0 | 1.0 | 1.0 | 0 |
| 0 | 1.0 | 0.50 | 0 | 0 | 1.0 | 0.75 | 0 |
| 0 | 0 | 0 | 0 | 0 | 0 | 0 | 0 | level 3.375

| 0 | 0 | 0 | 0 | 0 | 0 | 0 | 0 |
|---|---|---|---|---|---|---|---|
| 0 | 1.0 | 1.0 | 0 | 0 | 1.0 | 1.0 | 0 |
| 0 | 1.0 | 0.25 | 0 | 0 | 1.0 | 0.50 | 0 |
| 0 | 0 | 0 | 0 | 0 | 0 | 0 | 0 |
| 0 | 0 | 0 | 0 | 0 | 0 | 0 | 0 |
| 0 | 1.0 | 1.0 | 0 | 0 | 1.0 | 1.0 | 0 |
| 0 | 1.0 | 0.75 | 0 | 0 | 1.0 | 1.0 | 0 |
| 0 | 0 | 0 | 0 | 0 | 0 | 0 | 0 | level 3.625

| | | | |
|---|---|---|---|
| | 1.0 | 1.0 | |
| | 1.0 | 1.0 | |
| | | | | level 4.0

| | | | |
|---|---|---|---|
| 0 | 0 | 0 | 0 |
| 0 | 1.0 | 0.75 | 0 |
| 0 | 1.0 | 1.0 | 0 |
| 0 | 0 | 0 | 0 | level 3.75

| | | | |
|---|---|---|---|
| 0 | 0 | 0 | 0 |
| 0 | 1.0 | 0.50 | 0 |
| 0 | 1.0 | 1.0 | 0 |
| 0 | 0 | 0 | 0 | level 3.50

| | | | |
|---|---|---|---|
| 0 | 0 | 0 | 0 |
| 0 | 1.0 | 0.25 | 0 |
| 0 | 1.0 | 1.0 | 0 |
| 0 | 0 | 0 | 0 | level 3.25

| | | | |
|---|---|---|---|
| 0 | 0 | 0 | 0 |
| 0 | 1.0 | 0.0 | 0 |
| 0 | 1.0 | 1.0 | 0 |
| 0 | 0 | 0 | 0 | level 3.0

MOIRE FREE MULTILEVEL HALFTONING OF COLOR IMAGES

FIELD OF THE INVENTION

The invention relates to the halftone reproduction of images, color or monochrome, by means of reproduction devices that are capable to render more than two tone values, such as electrophotographic printers, displays, ink jet printers and others.

BACKGROUND OF THE INVENTION

Binary Screening

Most of the literature on halftoning discusses techniques that are specifically suited for binary devices. This is to be expected as the earliest halftoning techniques were developed to overcome the limitations in tone rendering of devices that were originally intended for the reproduction of text and line-art only. The most representative example of such a device is the "offset printing press". This device is characterized by a very high spatial resolution—lines with a width of just 20 micron can still consistently be printed—but with essentially only two consistently reproducible tone values corresponding to ink or no ink. Tones of a variable darkness can be rendered on such a device by modulating the size and/or distance between "halftone dots" and this technique is called "halftoning".

Multilevel Screening

History

Perhaps the earliest printing device that was able to render more than two tones is the "gravure printing process". The printing member in that case consists of a rotating copper cylinder with "wells" that transfer the ink from the fountain to the substratum. The wells are organized on a fixed geometrical grid and by imagewise modulation of their depth and/or the size, the printing member transfers more or less ink to the substratum so that different tones are printed. Because of the absence of screening artifacts such as rosette's, this process is able to achieve a very fine—almost photographic like—rendering of images, while the copper cylinder is known to have a much longer runlength than the conventional offset plates.

The Need for Multilevel Screening

Multilevel halftoning techniques have recently regained attention for use in combination with devices that have too low a spatial resolution to achieve acceptable image quality in combination with binary halftoning. It is known that a screen with a frequency of at least 120 lpi is necessary for a satisfactory rendering of image detail. On the other hand are at least 100 gray levels necessary for the smooth rendering of degrades and images with slow tone transitions. If both requirements are to be met at the same time—and this is a conservative requirement—a binary device is necessary with at least 1200 dpi. Because of technical limitations, this is not always possible and multilevel modulation, if possible, provides a solution to enhance the quality of the images on such devices.

A representative of such a process is the electrophotographic printing process shown in FIG. 1 and marketed by Agfa-Gevaert N.V. under the name "ChromaPress". The principle operation of this printing device is now explained. 100 is a an organic photoconductive layer rotating in the indicated direction. The surface of this cylinder is charged uniformly when it passes by a corona station 110. It is than imagewise exposed by a LED-bar 120. The result of this exposure is a latent image consisting of electrical charges on the drum. The drum than passes by a "developing unit" 130 in which toner particles are transferred from the unit to the drum by means of an electrically neutral "magnetic brush" 131 to the surface of the drum. As the flow of toner particles is controlled by the strength of an electrical field, this flow will be selectively modulated by the electrostatic latent image on the drum and hence the electrostatic latent image will be developed into a toner image on the drum. This toner image is transferred onto the substrate 140 by the transfer unit 150 and after which it is fused into it by means of heat. Further details on this printing process are found in EP-A-0 634 862.

There are several reasons why the spatial resolution of such a printing device is relatively low (600 dpi) compared to the resolution of, for example, the laser imaging film recorders (2400 dpi) that are used for the production of printing plates in the pre-press industry. A first reason has to do with the nature of the exposure unit. Current technology does not allow to manufacture LED-bar's with more than 600 LED's per inch. Except if expensive anamorphic optics are used does this result in a hard limit on the addressability that can be achieved in the "fast scan" direction. This limitation does not exist in recorders that use laser scanning optics. A second limitation results from the demands on throughput that are required for plain papers printer which are much higher than they are for film recorders. Increasing the spatial resolution causes the amount of image processing and digital data to increase according to a square law, making this option unattractive when throughput has the highest priority. It would appear hence that achieving good image quality with such a device is not possible, unless if the LED's are not just on/off modulated, but that use is made of the possibility to modulate these LED's for levels in between. If, for example, a modulation scheme would be used that enables to drive the LED's not at 2 but at 5 distinct, well selected exposure levels, an image quality could be achieved at a spatial resolution of 600 dpi that is virtually equivalent to the image quality of a binary device operated at 1200 dpi, while the amount of digital data has only doubled as opposed to quadrupled. This explains why devices such as this one provide the capability to be driven as "multilevel" devices.

Binary Screening

Several techniques have been described to calculate halftone data that capitalizes on the "multilevel" or "contone" capability of such devices. Before proceeding to this, however, the basics of binary screening are repeated first by means of a one dimensional model. FIG. 2 shows a screening function 200 superimposed on to of the image information 210. The amplitude of each of these individual signals is limited between 0 and the level indicated 220. The sum of both is thresholded at the level 220, and depending on the outcome, a black 230 or white level 240 is recorded. As the drawing shows, a binary dither pattern results with the same period as the screening function and of which the average tone value corresponds to the average tone value of the image information. Assuming that $C(i,j)$ represents an two dimensional image function ranging from 0 to 255, that $S(i,j)$ represents a two dimensional screening function ranging from 1 to 255, the onebit halftone function $H(i,j)$ is calculated as (using the C-language convention):

$$H(i,j)=((0\times100)\&(C(i,j)+S(i,j)))>>9$$

The technique is referred to as "simple binary thresholding".

A First Multilevel Screening Technique

According to a first class of multilevel techniques, a tone is rendered by first selecting the interval of the two tone levels that are available on the multilevel device and in which the desired tone level is enclosed. A periodic dither pattern is than used to alternate between these two tone levels so that an average tone level results that corresponds to the desired tone level. This class of screening technique can be described as "contone modulation with spatial dithering superimposed on it". An example of an implementation is found in FIG. 3.

For an 8 bit system, a two bit halftone function $H(i,j)$ is obtained from (using the C-language convention):

$$H(i,j)=(0B11.0000.0000)\&(3*C(i,j)+S(i,j))>>10$$

We will refer to this first technique as "Tonal quantization with spatial dithering superimposed on it". The technique lies emphasis on use of the rendering device in contone mode, and uses spatial dithering only to overcome the too limited tonal resolution. This type of halftoning corresponds to the "partial dot" type as it is described in U.S. Pat. No. 5,258,849. It is characterized by the fact that the dither components introduced by the halftoning have a low amplitude and therefore cause a minimum of image degradation: contrast detail is well preserved and little subject moire is introduced. A disadvantage is that this type of dot is relies heavily on the capability of the rendering process to render multilevel tones in a stable and consistent way. Sometimes this is the case (as with a CRT e.g.) but often it is not. Except in its two binary states (minimum and maximum density), the electrophotographic process is not capable to render the in between tone values consistently. The actual rendering of such tones is heavily influenced by a variety of external factors that are often difficult to control such as: the humidity of the paper and the air, "spatial cross talk" (the density of neighboring, "temporal cross talk" (the history of the pixel density on a particular location of the drum), temperature, condition of the developer particles, . . . This first class of halftoning techniques is therefore not favored for use in combination with electrophotographic printers.

A Second Multilevel Screening Technique

According to a second class of multilevel techniques, a tone is rendered by means of two non intersecting screening functions instead as opposed to one. This technique is shown in FIG. 4.

The two screening functions are indicated as 410 ($S1(i,j)$) and 420 ($S2(i,j)$) and are each added to the image function 430 ($C(i,j)$). By means of a simple thresholding technique, the relative position of the image function with regard to each of the two screening functions can be coded into a corresponding number of binary functions $H_1(i,j)$ and $H_2(i,j)$. Assuming that the screening functions do not intersect, there are only three possible ways that the two binary functions can combine, and a different output value 440, 450 or 460 for the halftone function $H(i,j)$ is associated with each of them. These relations are summarized by the following two formula's and table:

| $H_1(i,j)$ | $H_2(i,j)$ | $H(i,j)$ |
|---|---|---|
| 0 | 0 | 0.0 |
| 1 | 0 | 0.5 |
| 1 | 1 | 1.0 |

$H_1(i,j) = ((0X100)\&(C(i,j)+S1(i,j)))>>9$
$H_2(i,j) = ((0X100)\&(C(i,j)+S2(i,j)))>>9$

This second technique can be referred to as "Spatial dithering with tonal quantization superimposed on it". The technique lies emphasis on use of the rendering device in binary mode, and uses tonal quantization dithering only to overcome the too limited spatial resolution to achieve acceptable quality and corresponds to the "partial dot" type in U.S. Pat. No. 5,258,849. Since this dot type behaves almost as "binary dot", it exhibits very robust and stable rendering, even on electrophotographic printers. On the other hand are the halftoning artifacts (subject moire, loss of image detail, screen structure) more visible than with the previous method. There exist two important variations for the implementation of this multilevel technique in two dimensions. According to a first implementation, a "binary" dot screen that is defined at a spatial resolution higher than the spatial resolution of the multilevel rendering device, is laid over the grid of microdots of the multilevel rendering device. The contone value that is used to drive a given microdot is obtained from the ratio of the area that the binary dot "covers" this microdot to the area of the microdot itself.

A second implementation is based on making the halftone dots grow according to a predefined sequence of microdots. The first microdots of the sequence are modulated to yield maximum density. The "last microdot" eventually is modulated with the correct intermediate value to give the halftone dot as a whole the desired absorption. More on this is found in U.S. Pat. No. 5,258,849. FIG. 8 in the current application gives an example how a halftone dot of four by four microdots on a five level rendering device grows from level 3.0 to level 4.0 though intermediate stages.

Other Multilevel Screening Techniques

The principles of the second technique can be easily extended to cases in which more than two screening functions are used such as in FIG. 5. The screening functions do not have to be "congruent" such as in FIG. 4. By using screening functions that have different shapes such as in FIG. 6, the width of the "contone fringe" can be made different for different parts of the tone scale and this leads us to a third class of techniques. Hybrid forms (FIG. 7) also exist between of the two first techniques.

A third technique has also been described in U.S. Pat. No. 5,258,849 in which the use of a "mixed type halftone dot" is suggested. This mixed dot features some of the characteristics of the above two multilevel screening techniques. For example is the rendering of the highlights optimized towards stability using the second strategy, while the rendering midtones and shadows leans more towards the first strategy to favor optimal detail contrast rendering and the reduction of screening artifacts.

A number of further improvements to improve printing stability and image quality are suggested in U.S. Pat. No. 5,204,753 (four quadrant tone calibration to improve the gradation of the rendering process), U.S. Pat. No. 5,258,850 (use of line screens to improve the printing stability) and U.S. Pat. No. 5,260,807 (strategy for "stabilizing" the rendering of halftone dots by increasing their density and diffusing the error that is introduced by this process).

Further information on implementation schemes for multilevel halftoning are found in U.S. Pat. No. 5,291,311 and the corresponding EP (use of a three dimensional look up table for multilevel halftoning) and EP 580,151 (mean preserving multilevel halftone matrices).

First Unresolved Problem: Stable and Less Stable Tones Method 2

Marketing research has revealed that for the application of electrophotographic printers in a production environment "stability", "predictability" and "consistency" is of the highest priority and is rated far more important than achieving a higher printing quality when this quality can not be guaranteed. As the "first" and "third" multilevel techniques both make extensive use of the contone capability of an electrophotographic printer they are due to produce results that are not as stable as possible and therefore are rejected for use in a production environment. This leaves only the second method (spatial dithering with tonal quantization superimposed on it) as a starting point. A disadvantage of this method, however, is that it leads to tone levels that are less or more stable, depending on their value. FIG. 8 explains this by means of an example of a screen with 4 by 4 microdots, each one of them capable to render 5 distinct tone values ranging from 0.0 to 1.0 in steps of 0.25. As the Figure shows, the levels 3.0 and 4.0 only consist of microdots with values 0.0 or 1.0, and therefore are likely to be rendered with excellent stability. This however is not true for the in between levels. The microdot with value 0.25 at the level 3.25 will not print stable in an electrophotographic process and might actually be rendered differently dependent on the process conditions. The same is true for the microdots with levels 0.50 and 0.75 in the tint levels with values 3.50 and 3.75. The instability is probably largest for tint that contains the microdot with value 0.5. The presence of tone values that are not stable in between tone levels that are stable can give rise to irregularities in the rendering of degrades and smooth tone transitions. The effect can be represented by means of the graph in FIG. 10. The dots 1000 indicate the tone levels that are rendered stable. The solid line 1100 indicates the "ideal gradation" of the printing device, while the dotted lines 1200 indicate the limits between which the actual gradation can shift as a result of process variations.

Second Unresolved Problem: Stability of Color in the Presence of Register Errors All of the improvements refer to screens that are used by themselves. In four color printing, however, more than one screen is used and additional color variations can result from phase errors between the screens that are used for the different inks or toners. Such phase errors can be constant (due to improper misregistration of one of the printers with regard to the others), periodic (for example due to eccentricities on the rollers that transport the paper web), or even random (due to vibrations or shocks solicited to the printer by external sources). In any case is a screening system needed that not only optimizes stability of the color rendering in each of the screens apart, but also optimizes stability of the screening system as a whole. None of the existing techniques provide a satisfactory solution for this purpose. A method that can be used in combination with binary devices has been described in U.S. Pat. No. 5,155,599, but this method can not be used in combination with low resolution devices such as electrophotographic printers, since it makes not use of the multilevel capabilities of such devices to improve the quality of the image reproduction.

Prior art document U.S. Pat. No. 4,365,275 discloses generation of halftone dots as a combination of binary microdots. U.S. Pat. No. 4,985,779 discloses the generation of soft dots in a halftoning technique. GB-A-2,091,518 discloses binary halftoning of a continuous tone image, controlling the luminous energy of an exposure light beam. EP-A-0 141 869 discloses a binary auto-typical halftoning technique with at least two thresholdmatrices, whose values are alternately selected on a random selection scheme.

OBJECTS OF THE INVENTION

It is a first object of the invention to provide a halftone screen for a multilevel rendering device that provides improved stability of tone rendition at every tone level in the presence of process variations.

It is a second object of the invention to provide a set of halftone screens for multilevel rendering device that provides improved stability of color balance in the presence of register variations.

Further objects and advantages of the invention will become apparent from the description hereinafter.

SUMMARY OF THE INVENTION

The above mentioned objects are realised by the specific features according to claim 1. Preferred embodiments of the invention are disclosed in the dependent claims.

By a minority is meant 34% or less. By a majority is meant 66% or more. In order to improve the stability of a halftone screen for multilevel rendering devices, it was found that an improvement was obtained by using halftone screens that consist of a mix of halftone dots which each by themselves are built according to the principles of the "second multilevel halftoning technique" (spatial dithering with tonal quantization superimposed on it)

but where each of the microdots that is modulated in contone is allowed to be in a "different state of development"

so that at every tone level the distribution of occurrences of intermediate microdot levels is essentially flat.

The invention can best be illustrated by comparing the situation between FIG. 8 and 9. The tone levels in FIG. 9 are obtained as a mix of four halftone dots, where each halftone dot is built according to the principles of the "second multilevel method", but where each one is in a "different stage of development". The result of this approach is that there are no tone levels any more that are more stable than others, i.e. the same predictable level of stability is expected for each tone level. FIG. 11 shows the new gradation curve and the expected variations on it. The maximum deviation that is expected as a result of process instability has also been reduced, since every tone level contains halftone dots that are completely "binary" and hence stable.

It was also found that an improvement in stability of the neutral balance in color rendering is obtained by using a set of different screens for the different colorants that are characterized by:

at least one angle and frequency for each of the screens a frequency vector corresponding to each such screen, the angle of which corresponds to an angle of the screen and the length of which corresponds to a frequency of the screen where the lengths of these vectors are not different by more than 5%; which means substantially equal.

where the vectors of these screens form a closed polygon.

The invention is described hereinafter by way of examples with reference to the accompanying figure wherein:

FIG. 8 shows a multilevel halftone screen according to the prior art

Figure 9:
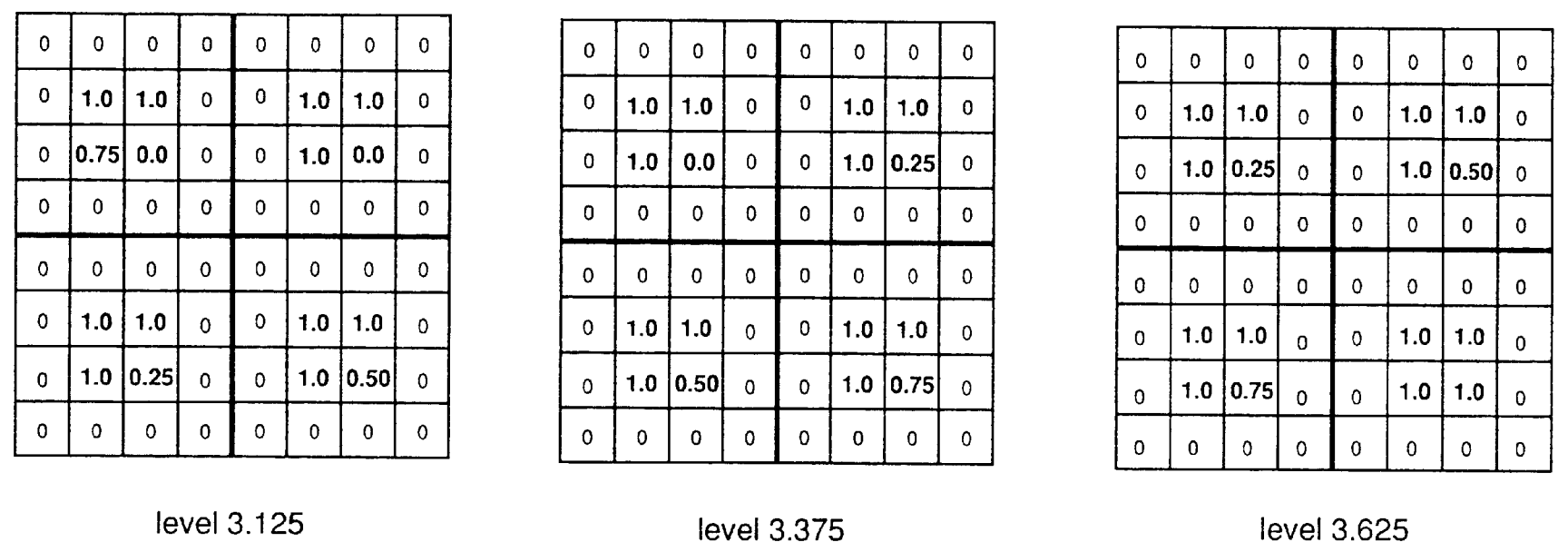

FIG. 9 shows an improved halftone screen, according to one of the embodiments of the current invention

DETAILED DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appending claims.

Selection of a Screening System

An extensive and quantitative analysis by K. Daels and P. Delabastita of the effects of register on color balance was published in the TAGA 1994 proceedings and has the title "Color Balance in Conventional Halftoning". It was shown that if three screens are used with angles that are different by 60 degrees or a multiple thereof, the effect of register on color balance can be minimized for binary screens. As halftone screens that make use of the multilevel capabilities of a rendering device contain less energy in the higher harmonics of their Fourier transforms, it can be concluded that these harmonics will also give raise to less intense geometric interactions, and that both the visibility and the effect on color balance of these interactions will be less than if binary screens are used. From this follows that the use of the screening system that is discussed in this article results in even less variation of color balance due to register variations if multilevel screens are used than it does in combination with binary screens.

A specific implementation of the above screening system was described in U.S. Pat. No. 5,155,599 for binary screens. It will now be explained how the same principles can be expanded for use in combination with multilevel screens. The calculation of the basic parameters that define the geometry of the screening system is completely parallel to the calculation as it is described in U.S. Pat. No. 5,155,599 on columns 9 to 12. For a device with a resolution of 600 dpi, the following set of parameters (their significance is found in column 10 of U.S. Pat. No. 5,155,599) could be selected.

screen1: A=4, B=15, TS1=176
screen2: E=16, F=16, TS2=96
screen3: C=15, D=4, TS3=176

This set of parameters would yield a set of three screens with a frequency of 141 lpi and angles of 15, 45 and 75 degrees that together form a moire free set.

Figure 1:
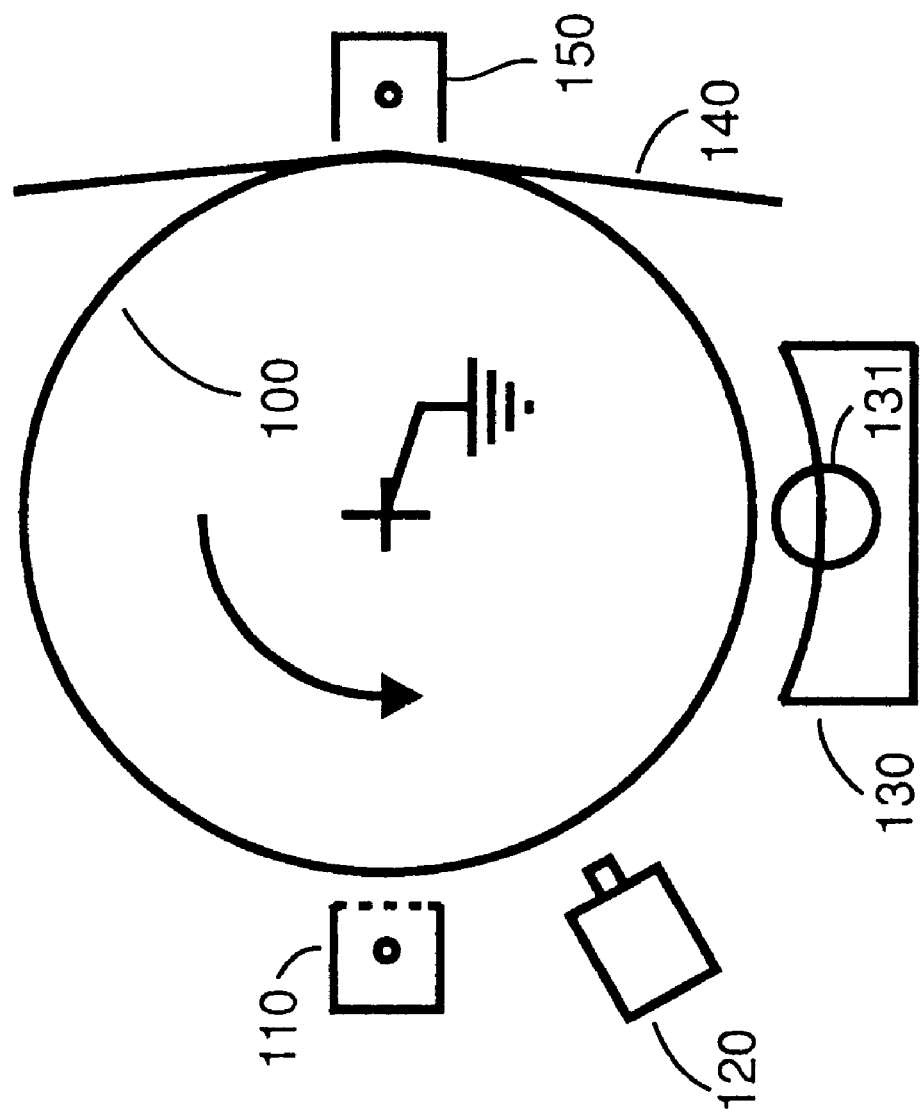
FIG. 1 shows an electrophotographic printing device.
Figure 2:
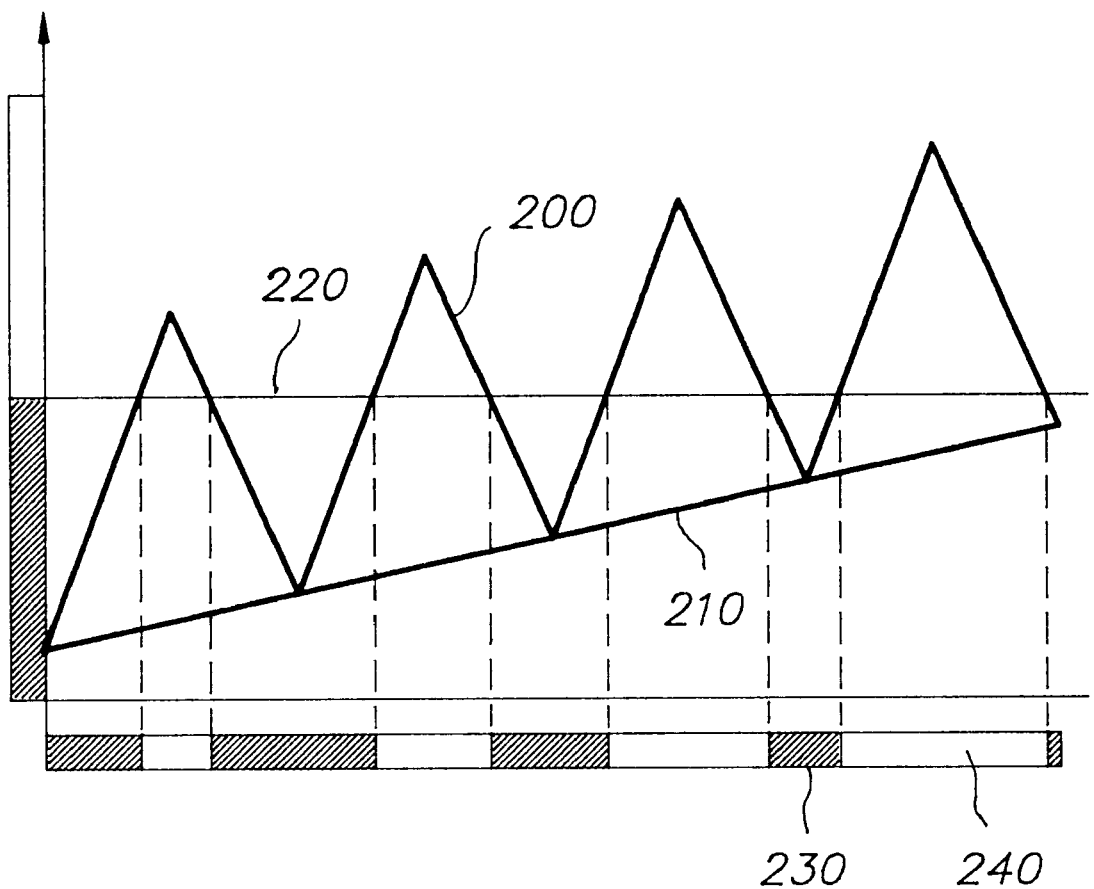
FIG. 2 shows a binary screening technique
Figure 3:
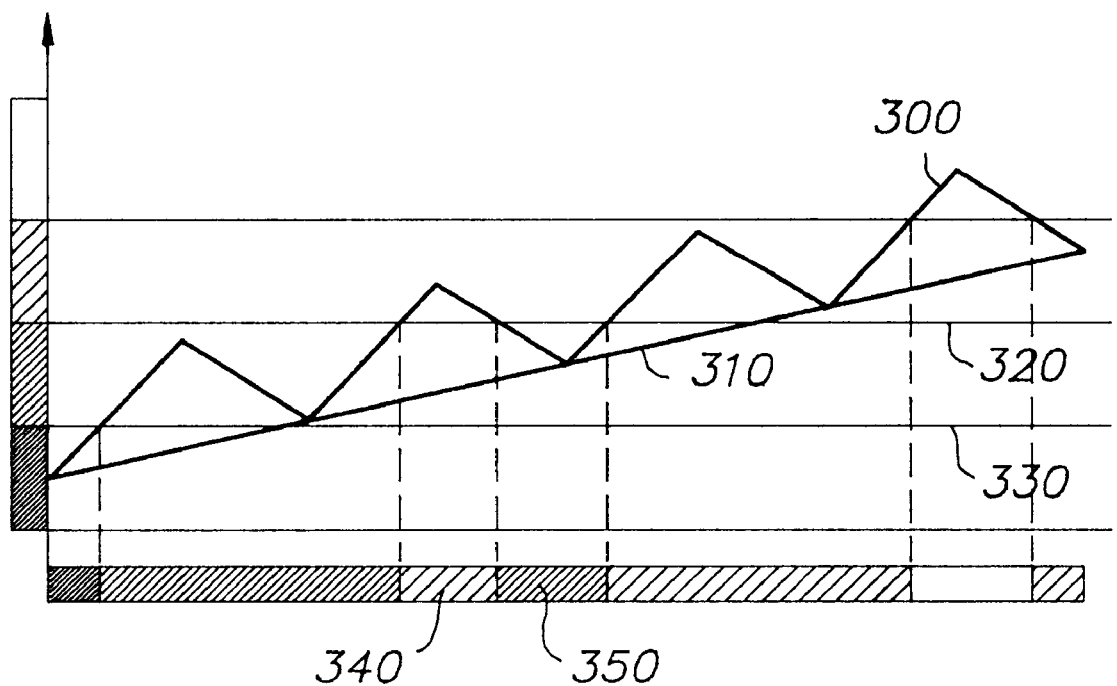
FIG. 3 shows a first multilevel screening technique
Figure 4:
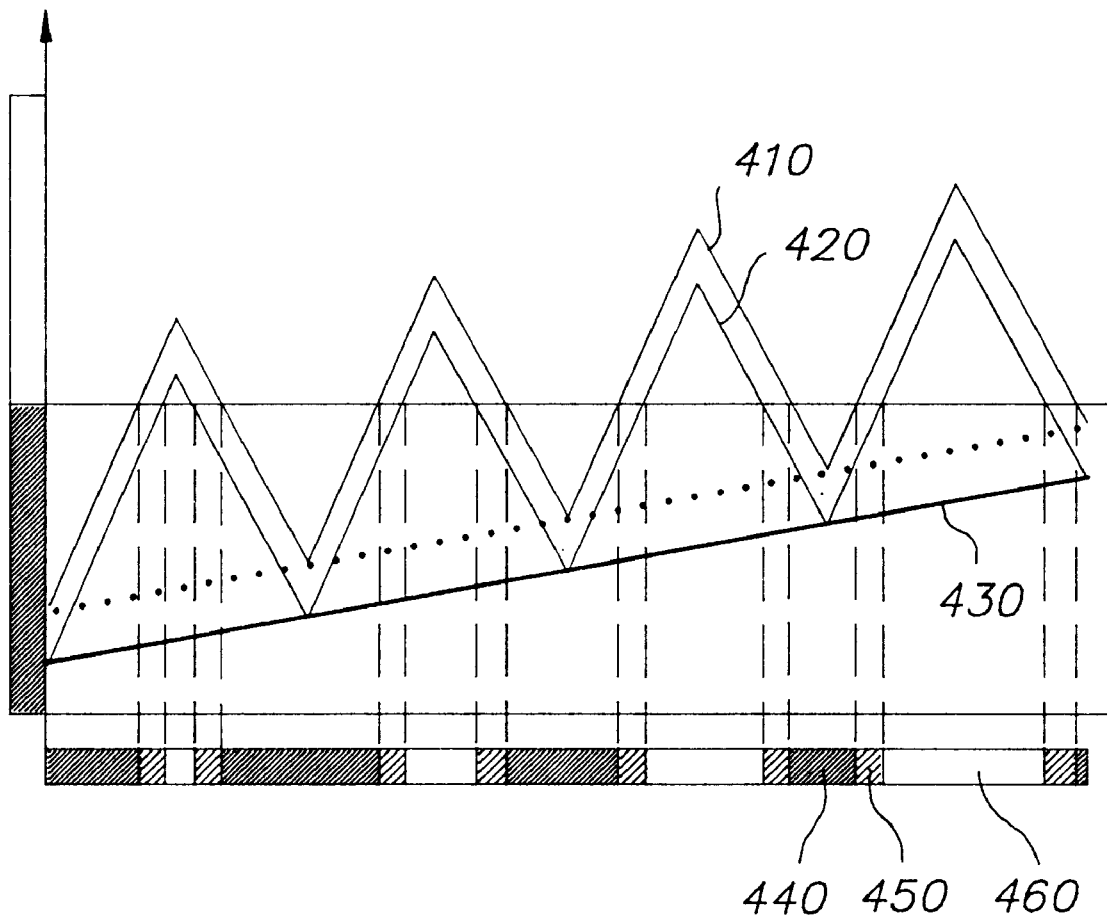
FIG. 4 shows a second multilevel screening technique
Figure 5:
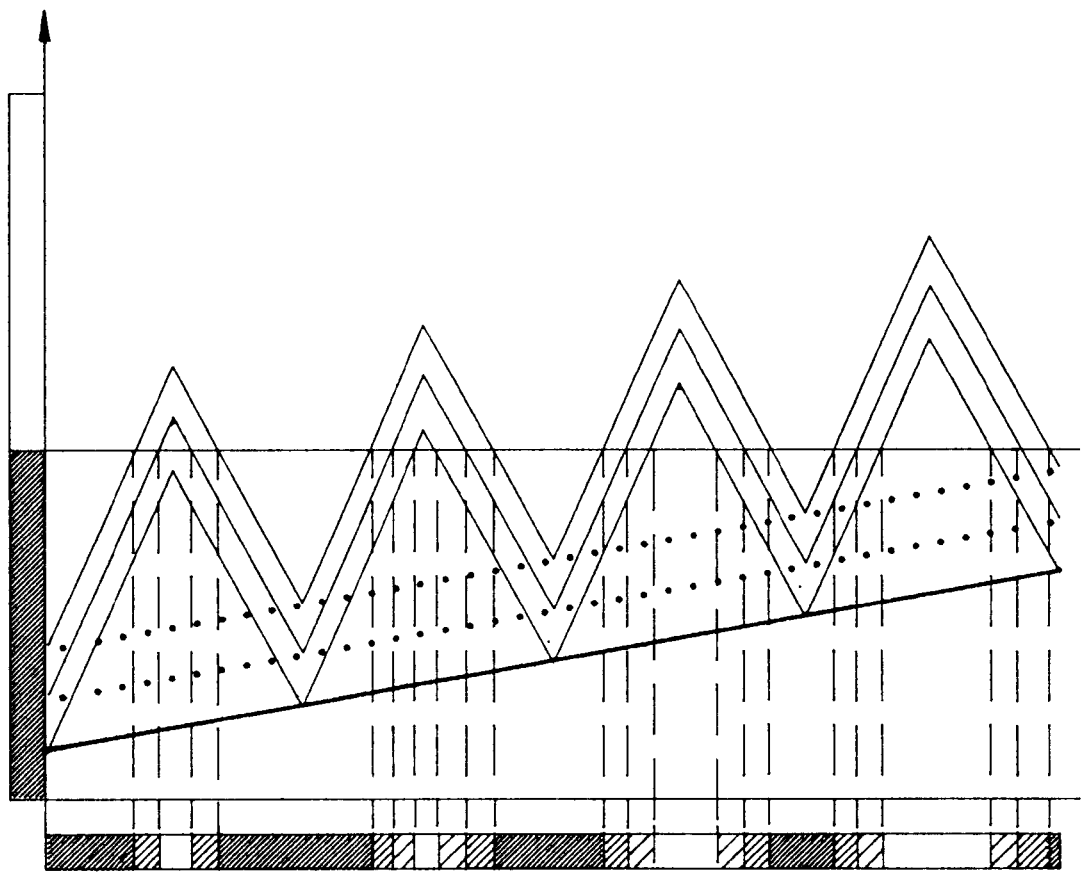
FIG. 5 shows a first variation on the screening technique shown in FIG. 4
Figure 6:
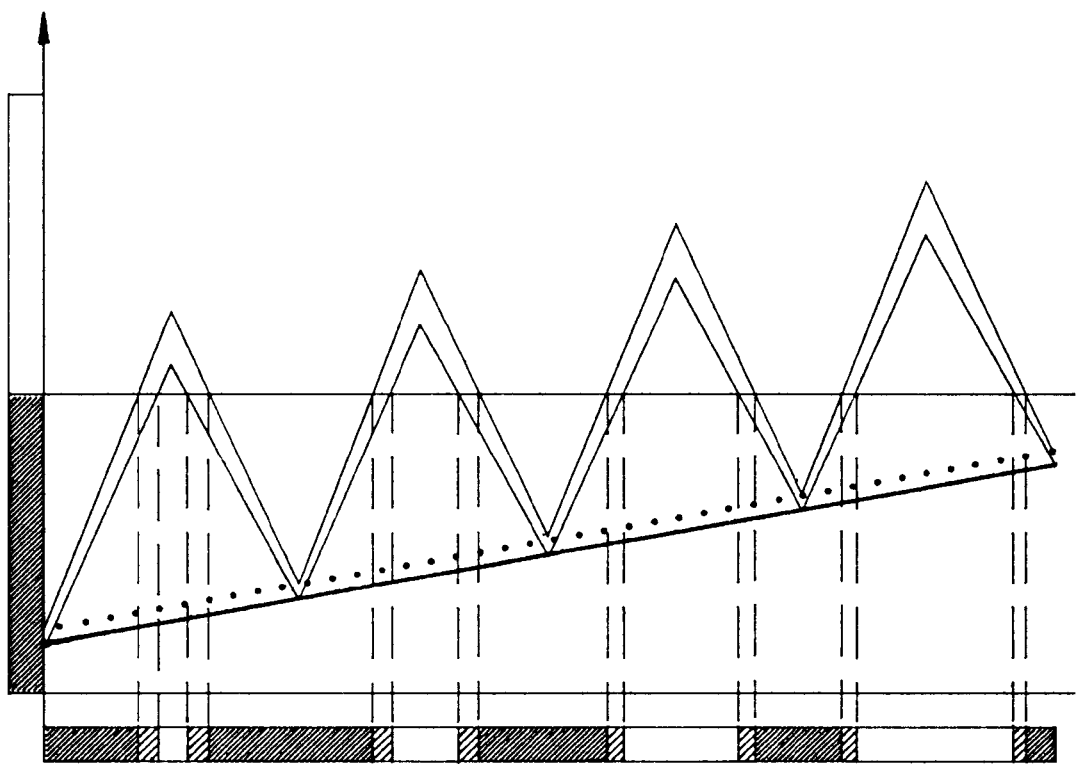
FIG. 6 shows a second variation on the screening technique shown in FIG. 4
Figure 7:
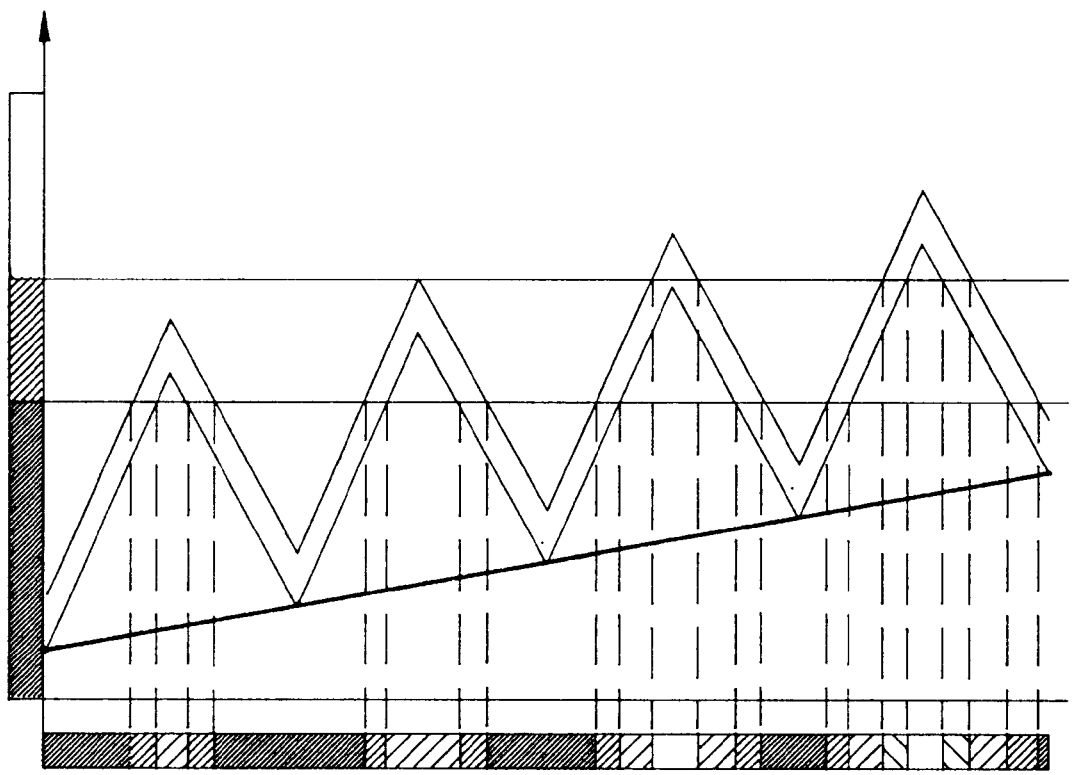
FIG. 7 shows a combination of the screenings techniques, shown in FIG. 3 and 4
Figure 10:
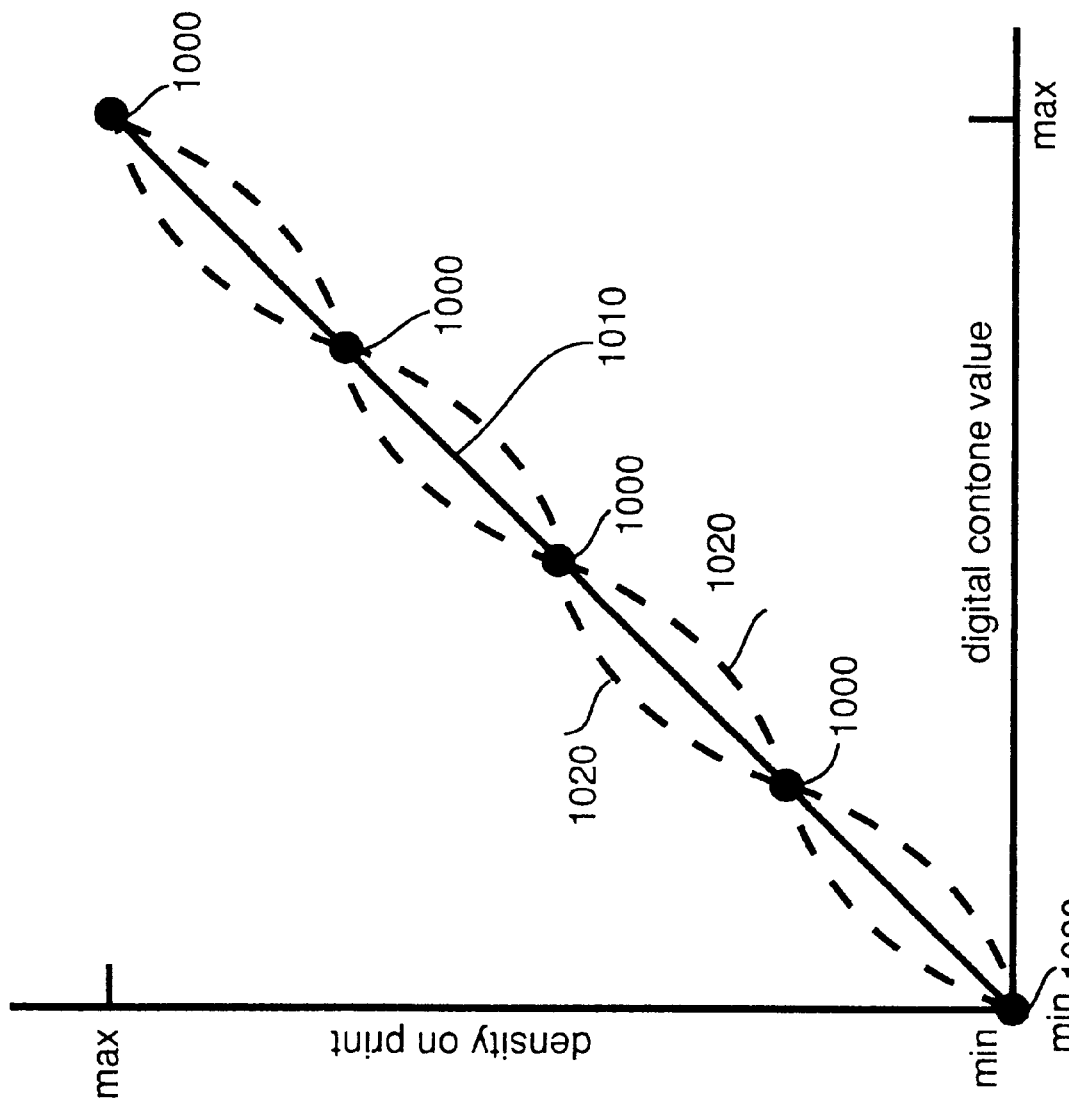
FIG. 10 shows degradation obtained by methods according to the prior art
Figure 11:
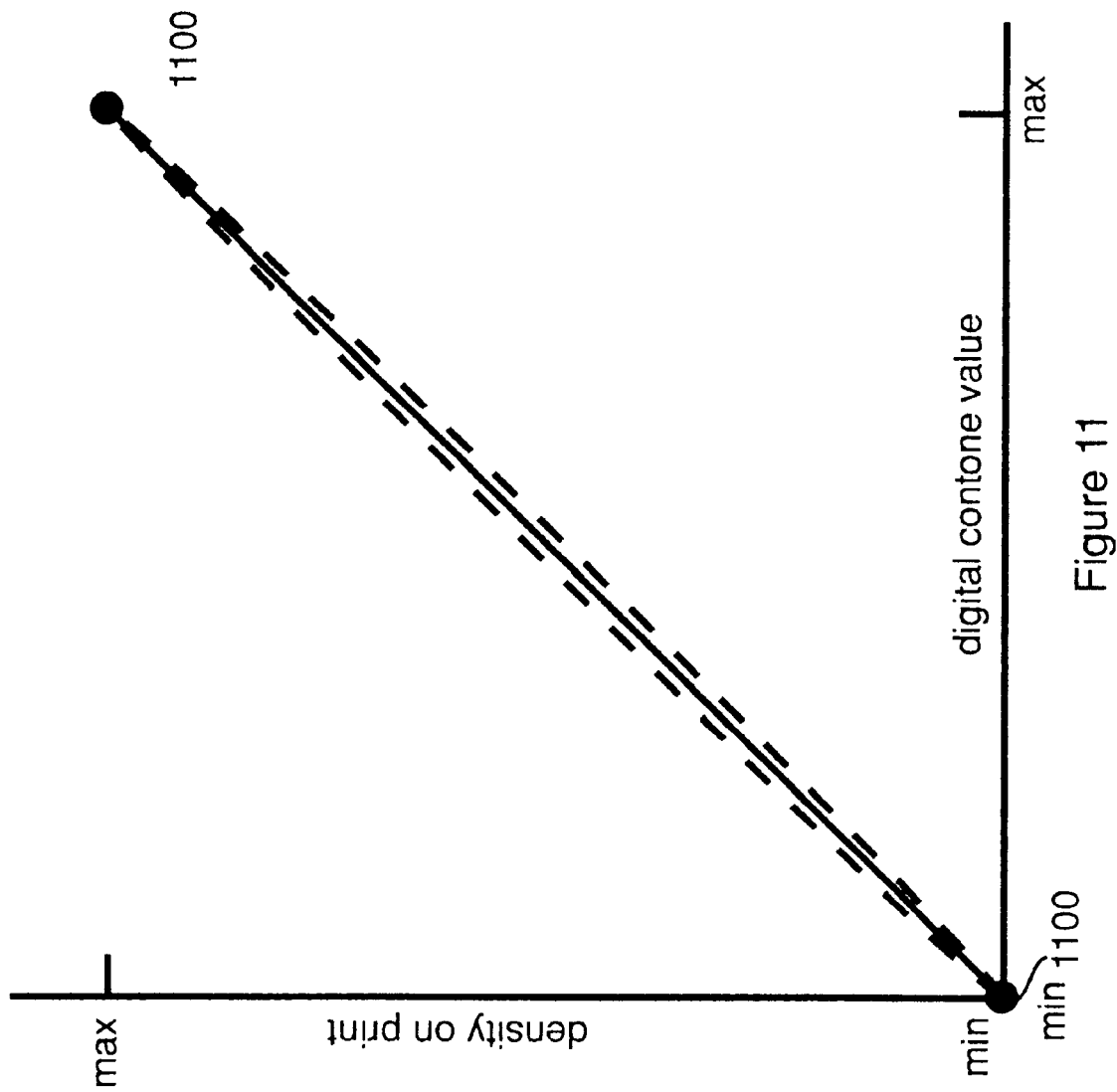
FIG. 11 shows an improved gradation curve, obtained by the invention

For the implementation of the multilevel screening process, the scheme with the multiple threshold functions in FIG. 4 was selected although other implementations such as the use of three dimensional look up tables in U.S. Pat. No. 5,291,311 are also possible.

It will now be explained in detail how the multiple threshold functions in FIG. 4 can be calculated in order to perform our invention.

Calculation of the Multilevel Threshold Tiles

Since the calculation of such a set of threshold functions can be seen as a problem by itself, our explanation will make use of an example in which the tile has a size of 12 and in which A=1 and B=3. It is assumed that the rendering device is capable to render 3 output values. For more realistic parameters we refer to the parameters given in the above paragraph.

Just like in the patent U.S. Pat. No. 5,155,599 a supercell or "tile" is characterized by a tilesize, indicating the linear size of the tile expressed in number of microdots, and two integer values A and B, defining the geometry of the halftone screen. The angle of the screen is given by the arctangent of A/B. The total number of halftone dots in the supercell is indicated with the name number_of_dots, and is expressed by the value of $A^2+B^2$. The total number of microdots contained in a supercell is indicated by number_of_rels and is equal to tilesize*tilesize. The number of threshold functions is indicated by number_of_functions.

Figure 12B:
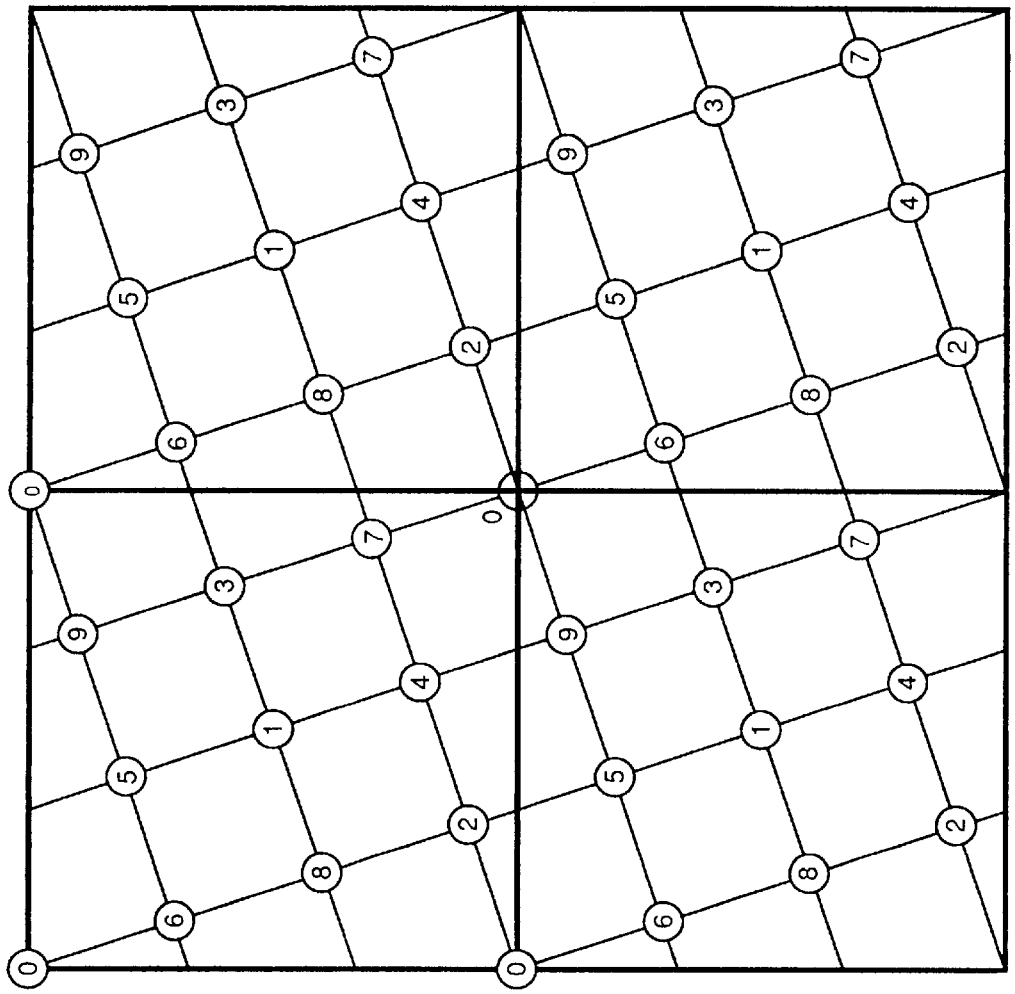
FIG. 12b shows the seamless combination of four screening tiles

The tile in the example has a size tilesize=12 and contains number_of_rels=144 microdots. For the selected values for A and B, the value of number_of_dots is equal to $A^2+B^2$ =10. The centers of the halftone dots are represented by circles in the FIG. 12a. FIG. 12b demonstrates how a contiguous screen is obtained by replicating the rational tangent supercell horizontally and vertically. Two threshold functions are needed to drive a three level rendering device and their calculation is now explained.

First Step: Calculation of Ordering Sequence for Halftone Dots in Supercell

A first step consists of assigning an ordering sequence to the number_of_dots halftone dots of the supercell. In order to come to an optimized ordering sequence, the following heuristic algorithm can be used:

The halftone dot that receives the first number of the sequence can be chosen arbitrarily.

The halftone dot that receives the second number is selected so that it is "as far away" as possible from the dot that has received the first sequence number, taking into account the horizontal and vertical replication.

The halftone dot that receives the third ordering number is selected to maximize its distance to the closest of the already selected halftone dots.

If this distance would be the same for two or more "candidate dots", the one candidate dot is given the third ordering number that maximizes the average distance between all three dots.

The same procedure can be used to select the fourth, fifth, . . . halftone dot, until all the dots in the tile have received an ordering number.

It can be shown that the above algorithm leads to dot distributions that have desirable "blue noise" characteristics.

Figure 12A:
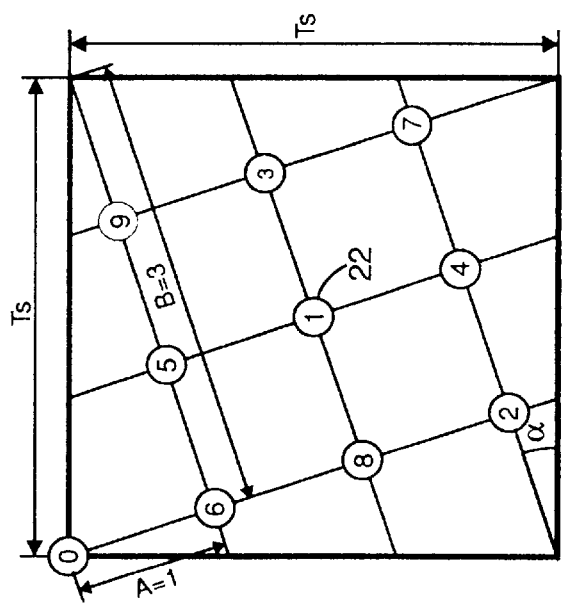
FIG. 12a shows a screening tile

The above algorithm was used to assign a sequence number, ranging from 0 to 9 to the 10 dots in the supercell of FIG. 12a.

Second Step: Assignment of Threshold Values to Screen Functions

This is done by means of four nested loops.

Before the outer loop is started, a variable relcounter is initialized to 0. The outer loop controls how many threshold values totally are assigned during the process. At the end of the process the variable relcounter is equal to number_of_rels*number_of_functions.

The second loop controls the visiting order of the number_of_functions threshold functions.

The third loop controls the order according to which every halftone dot is "visited".

In the inner loop, a spotfunction S(dot,rel) is evaluated for every microdot belonging to the tile and that has not been assigned yet to a halftone dot. An example of such a spotfunction is:

$$S(dot,rel)=(x_{dot}-x_{rel})^2+(y_{dot}-y_{rel})$$

in which $(x_{dot},y_{dot})$ represents the position coordinates of the center of the halftone dot, in which $(x_{rel},y_{rel})$ represents the position coordinates of a candidate microdot, and in which the spotfunction itself corresponds to the square of the Euclidean distance between the halftone dot center and the position of candidate micro dot. At the end of the inner loop, the one microdot is retained that yields the lowest value for the spotfunction, and the value of the variable relcounter is assigned to it, after which the variables relcounter is incremented by one. When at the position of a microdot number_of_functions threshold values have been assigned, it is marked as "assigned" to that halftone dot. By adding a small random value to the position coordinates of the halftone dot center, the possibility that two candidate microdots would yield the same spotfunction value can be virtually eliminated.

The following pseudo-code summarizes the algorithm:

```
relcounter=0
do until (relcounter = number_of_rels*number_of_functions)
   {
   Select (number_of_screenfunctions in their order)
      {
      for (all the dots in the supercell,
         in order of their assigned sequence)
         {
         for (all microdots in supercell that have not
            yet received number_of_functions thresholdvalues)
            {
            evaluate spotfunction of microdot
            in combination with halftone dot
            }
         select the microdot that yields
            the lowest spotfunction value
         assign the value relcounter to the selected screenfunction
            at the position of the selected microdot
         relcounter= relcounter+1
         }
      }
   }
```

Third Step: Resealing the Range of Matrix Elements to Obtain a Screen Threshold Matrix.

At the end of the previous, number_of_functions square matrices with tilesize by tilesize thresholdvalues are obtained that contains values ranging from 0 to number_of_rels*number_of_functions-1. Before these matrices can be used as a screening threshold matrices, their elements have to be rescaled to the same range as the range of image pixels in combination with which it is used. For a system with 8 bits, the range of the image pixels is from 0 to 255. Therefore the range of threshold values has to be expanded from 1 to 255. This is done by multiplying every element by a constant factor equal to (254)/(143), adding 1 to the result and by rounding off the result to the closest integer number.

Alternatively a non proportional scaling is possible from the original matrix values to the final screen threshold tiles. Such a non proportional scaling can be used to build a non linear relationship in the screen between the pixel values of the unscreened image and the device values into which these values are translated during the screening.

Screening an Image

Figure 13:
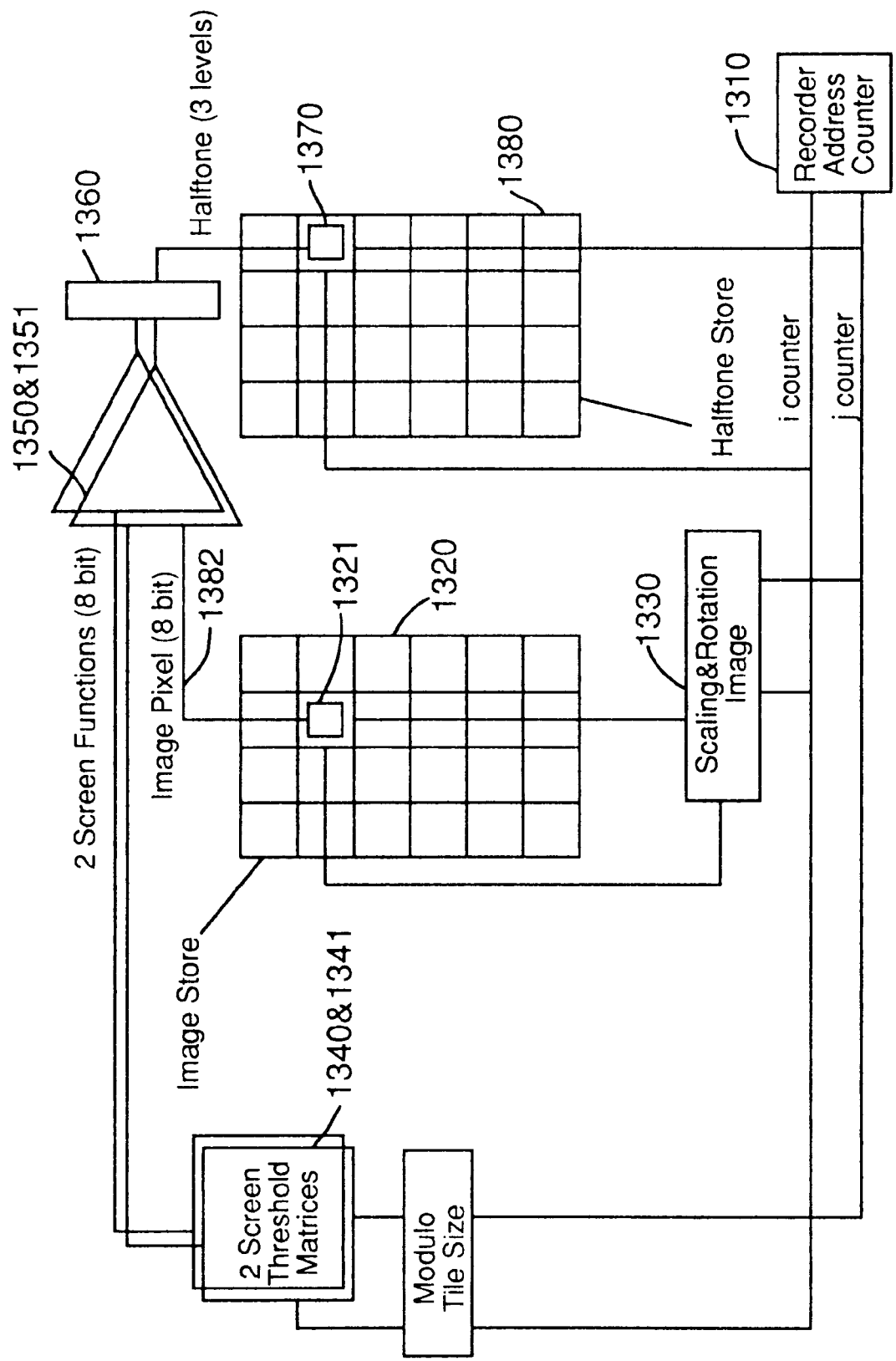
FIG. 13 shows a circuit to perform the current invention

At this point the threshold matrices can be used in combination with the circuit shown in FIG. 13. 1310 is an address counter counting the recorder positions row by row, column by column. 1310 contains is a memory store containing the unscreened image pixels 1321. These pixel data are read from the memory by transforming the recorder position coordinates through a scaling and rotation unit 1330. The same recorder position coordinates are used to select a set of number of (in this case) 2 screenfunction values in the stores 1340 and 1341. The screenfunction values are each compared in the comparators 1350 and 1351 with the pixel value 1321 and the resulting 2 bit code is used as an address to the look up table 1360. This look up table contains for every of the possible combinations of the two bit code an appropriate device value 1370 which is stored in the memory store 1380. The scheme can easily be extended for the case of more than two screenfunctions.

Having described in detail preferred embodiments of the current invention, it will now be apparent to those skilled in the art that numerous modifications can be made therein without departing from the scope of the invention as defined in the following claims.

We claim:

1. A method for reproducing a region of an image having a constant gray level throughout onto an output medium, the method comprising the steps of:

representing the region as a plurality of different halftone cells of microdots, each halftone cell comprising a majority of said microdots assigned to a minimum or maximum density level, and a minority of said microdots assigned to intermediate density levels between said minimum and maximum density levels; and representing each said halftone cell within the region as having different intermediate density levels from each said halftone cell having a common border therewith.

2. Method according to claim 1, wherein said different intermediate density levels are homogeneously distributed among small clusters of said halftone cells.

3. Method according to claim 2, wherein all said intermediate density levels within said small cluster are different from each other.

4. Method according to claim 2, wherein said homogeneous distribution is not substantially dependent on the selected tone value of the region.

5. Method according to claim 1, wherein microdots having a high density level are arranged in one convex halftone dot within said halftone cell.

6. A method according to claim 1, wherein said method further comprises the steps of:

selecting at least one screen ruling for each color component, said screen rulings for different color components being substantially equal; and, selecting at least one screen angle for each color component such that mathematical vectors having lengths proportional to said screen rulings for different color components and orientations equal to said screen angles for different color components form a closed polygon.

* * * * *